United States Patent [19]

Johansson

[11] 4,285,309

[45] Aug. 25, 1981

[54] HOUSING FOR AN INTERNAL COMBUSTION ENGINE

[75] Inventor: Rolf A. G. Johansson, Unnaryd, Sweden

[73] Assignee: Jonsereds Aktiebolag, Partille, Sweden

[21] Appl. No.: 94,039

[22] Filed: Nov. 13, 1979

[51] Int. Cl.[3] .......................... F02B 77/02; F02F 7/00; B23D 57/02

[52] U.S. Cl. ............................ 123/195 C; 123/198 E; 181/204; 30/124; 30/383

[58] Field of Search ........... 123/195 R, 195 C, 198 E, 123/198 R; 181/204; 30/381, 382, 383, 384, 385, 124

[56] References Cited

U.S. PATENT DOCUMENTS

| | | | |
|---|---|---|---|
| 3,036,566 | 5/1962 | Dobbertin | 123/198 E |
| 3,157,211 | 11/1964 | Wiig | 123/195 C |
| 3,195,530 | 7/1965 | Heidner | 123/195 R |
| 3,372,679 | 3/1968 | Aitken | 123/198 R |
| 3,525,373 | 8/1970 | Kobayashi | 30/381 |
| 3,747,649 | 7/1973 | Denson et al. | 30/381 |
| 3,798,769 | 3/1974 | Bailey | 30/383 |
| 3,934,344 | 1/1976 | Lnaga | 30/381 |
| 3,994,067 | 11/1976 | Hazzard et al. | 30/383 |

*Primary Examiner*—Ira S. Lazarus
*Attorney, Agent, or Firm*—Alfred E. Miller

[57] ABSTRACT

A housing for an internal combustion engine of the type used with portable chain saws having a cavity therein for a fuel supply and another cavity for lubricating oil. The engine housing is composed of at least an upper and a lower portion which are joined along a substantially horizontal dividing plane which is substantially parallel to the bottom plate of the lower portion of the engine housing. The dividing plane intersects the crankshaft casing of the engine whereby two separate closed cavities are formed for separately storing fuel and lubricating oil for said chain saw.

10 Claims, 12 Drawing Figures

HOUSING FOR AN INTERNAL COMBUSTION ENGINE

The present invention relates to a housing for an internal combustion engine, especially for chain saws, of the type provided with cavities adapted for holding fuel means and lubricating oil for the chain saw.

Portable internal combustion engines, such as chain saws are for their operation dependent on fuel means and lubricating means to be continuously provided, whereby cavities for fuel and oil are preferably arranged in the engine housing. For reasons of assembly and in order to enable measures to be taken for maintenance and repairs to the internal combustion engine, the engine housing has been hitherto usually shaped of two or more housing parts which are fastened together along a substantially vertical dividing plane, which is extended through the cavities for fuel and oil, and through the crankcase, etc. As the dividing plane is extended through the crankcase this, among other things, results in that the two bearing seats in the crankcase are disposed in separate housing parts. The foregoing assembly requires a high degree of accuracy of manufacture and of rigidness of the respective housing part, i.e., with regard to the finishing of the bearing seats, for which reasons the housing parts are provided with thick walls.

The purpose of the present invention is to eliminate the drawbacks of known chain saws, and to provide a construction of an engine housing which is inexpensive to manufacture, simple to assemble, easy to carry and handle, and also inexpensive and simple to repair. According to the teachings of the present invention this purpose is achieved by making the chain saws with an engine housing having an upper and a lower portion that are joined along a plane that is parallel to the bottom of the lower portion, and forming closed cavities for holding fuel and lubricating oil.

An embodiment of the invention is described in the following with reference to the attached drawings of which:

Figure 1:
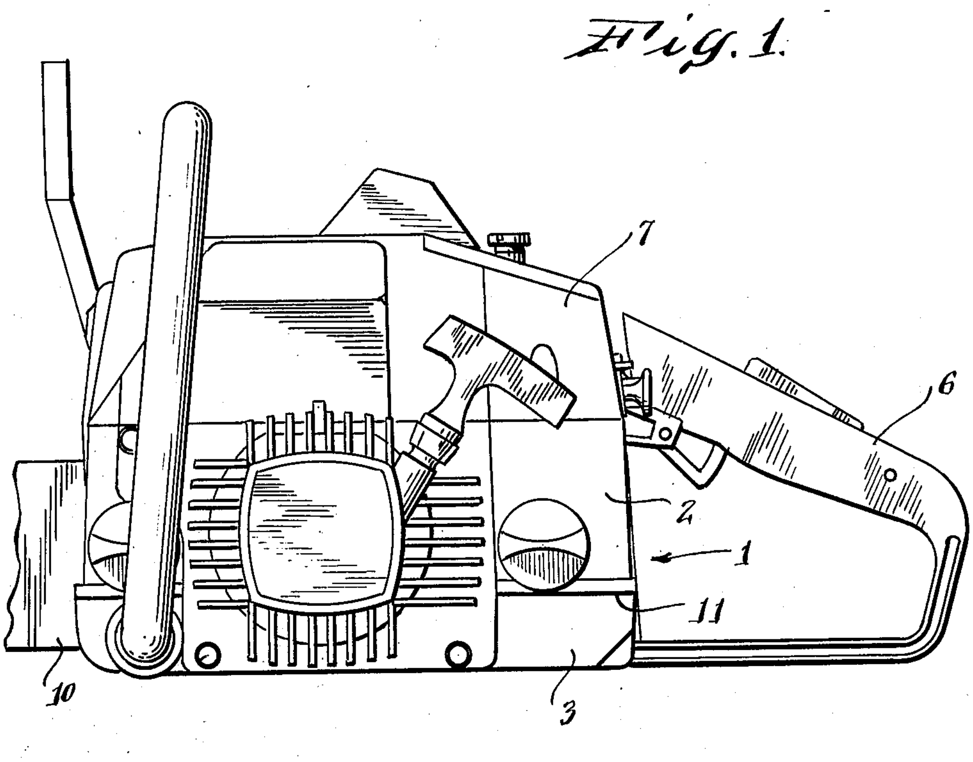
FIG. 1 is a side elevational view of a chain saw constructed according to the teachings of the present invention.
Figure 2:
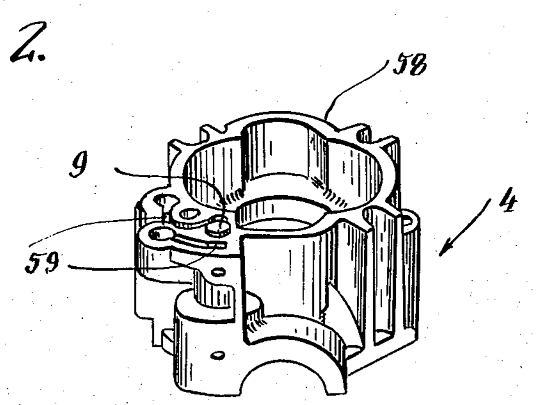
FIG. 2 is a perspective view of the crankcase upper half.

The engine housing 1 constructed according to the teachings of the present invention is substantially composed of an upper and a lower housing part 2 and 3, and an upper crankcase part 4, a cylinder 5, a handle 6, a casing 7, a gasifier 8, an oil pump 9, and a saw 10. The upper and lower housing parts 2 and 3 are joined along the substantially horizontal dividing plane 11, disposed somewhat below the crankshaft of the engine (not shown) and, in principle, parallel to the lower plate 12 of the lower housing part 3. In the middle of the upper housing part 2, the lower part of the crankcase of the engine 13 is disposed, in which seats 14 of the crankcase bearings and seals (not shown) are disposed. A recess 15 for the oil pump 9 is also arranged in the vicinity of the crankcase 13. The upper housing part 2 is provided with substantially vertical side walls 16–19, in which two holes 20 and 21 are made along one of the long sides 17. The side walls 16–19 are at the dividing plane 11 provided with grooves 22, which are intended to receive the edges 23 of the lower housing part, facing the dividing plane. By means of the special geometric shape of the upper and lower housing parts 2 and 3, a rigid and stable engine housing is provided, which enables the finishing, for example, milling of the edges of the crankcase facing the dividing plane.

A substantially flat rectangular bottom plate 12 is provided on the lower housing part 3 and has on its rear portion, turned from the saw 10, a substantially cylindrical-shaped recess 24 for engagement with a shaft fastening means 25 disposed at the handle 26. The vertical walls 26–29 of the lower housing part 3 and a dividing wall 30, perpendicular to the two long walls 20 and 28, and the bottom plate 12 of the lower housing part form two box-shaped cavities 31 and 32. In order to facilitate the fastening of the gasifier 8 at its rear end there are two vertical legs 34 and 35 on the upper housing part 2. At the upper end of the legs there are U-formed grooves 36 and 37 arranged to receive a screw for assembling the gasifier. The gasifier is connected to the cylinder by an intake pipe 67, and between the legs 34 and 35, and the gasifier 8, the holding means (not shown) for an intake air filter connection 68 are preferably positioned. Moreover, the air filter connection connects the intake of the gasifier 8 with an air filter (not shown).

The gasifier 8 can also be supported by jamming the same between the upper housing part 2 and the casing 7. In order to increase the reliability of such an assembly resilient elements or rings (not shown) are placed below and above the gasifier 8 and pressed together against the gasifier 8 when tightening the screws of the casing 7. In order to keep the resilient elements in their respective positions a ring-shaped holder 66 is provided on the upper housing part 2. In addition, the casing 7 could be provided with a similar holder.

Furthermore, the handle 6 is preferably made of plastic, and in one piece, and includes an engaging part 38, a support 39, and a hand shield 40 connected to it. An upper shoulder-shaped holder 41 is positioned at the upper part 38 of the engaging part, facing the engine housing, and a lower, also mainly shoulder-shaped, holder 25 is arranged at the bottom part of the support 39 in such a way that both the upper and lower shoulder-shaped holders 25 and 41, at their outer ends, are provided with anti-vibration members in the form of rubber elements 42 and 43. The lower shoulder-shaped holder 25 is displaceably arranged in the cylinder-shaped recess 24 in the lower housing part 3, so that the cone-shaped rubber elements 44 and 45 are substantially supported on the inside of the cylinder-shaped recess 24, thereby permitting a certain degree of vertical movement. Since an internal combustion engine vibrates mainly in the same direction as the piston works, a favorable vibration damping is achieved by means of the present particular mounting of the handle. The upper shoulder-shaped securing means 41 of the handle are by means of rubber elements 42 and 43 positioned in corresponding recesses 46 and 47 in the upper housing part 2. Furthermore, the upper shoulder-shaped securing means 41 are maintained in position by means of the casing 7. Thus, screws, or other fastening means, are unnecessary for the securing of the handle 6, but screws are required for the securing of the casing 7.

A fan (not shown) for the cooling of the engine is rotatably mounted in a box-shaped fan housing 53 located at one of the long sides of the engine housing. The fan housing is positioned in both the upper and the lower housing parts 2 and 3, and is provided with corners 54 in which sawdust and similar debris are ejected. In this manner sawdust is not carried by the cooling air to the cylinder where it adheres to the cooling flanges of the cylinder 5.

In the upper crankcase part 4, which together with the upper housing part 2 form the crankcase 13, an oil pump 9 is mounted, which is known per se. The cylinder-shaped pump piston 55 is vertically displaceably arranged in a cylindrical chamber 56 mounted in the upper crankcase part 4. The cylinder chamber of the oil pump 9 is limited upwardly by a surface 57 of the engine cylinder 5, or by a gasket (not shown) in the dividing plane 58 between the engine cylinder 5 and the crankcase part 4. In the upper surface 60 of the crankcase part 4 abutting the engine cylinder 5 grooves 59 are preferably made, which together with the bottom surface 57 of the cylinder, or the said gasket, form inlet and outlet channels which are connected to the oil pump 9 for the respective input and output pipes 61 and 62. The pump piston 55 is, by means of a pinion 63, in engagement with the crankshaft of the engine (not shown) which brings about a rotating movement of the pump piston 55. The oil pump 9 is also provided with an inclined surrounding groove 64, in which a guiding member 65 connected to the crankcase part 4 projects. When the pump piston 55 rotates, it will simultaneously be displaced forward and backwards in the cylinder chamber 56 by means of the guiding member 65.

Figure 3:
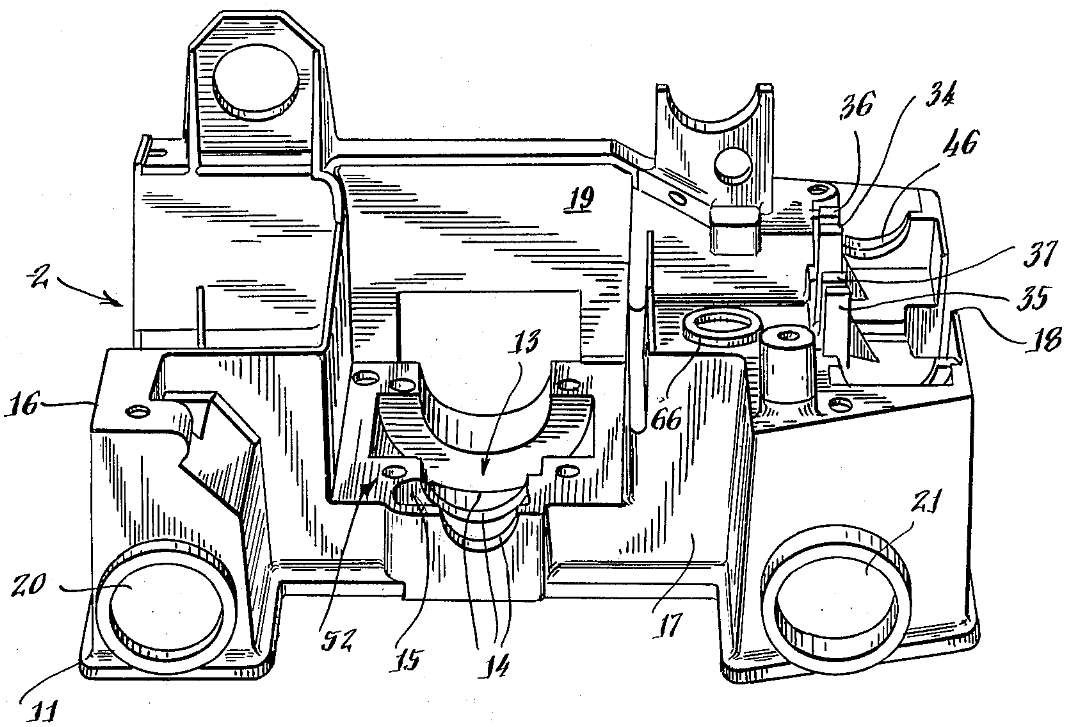
FIG. 3 is a perspective view of the upper engine housing.
Figure 4:
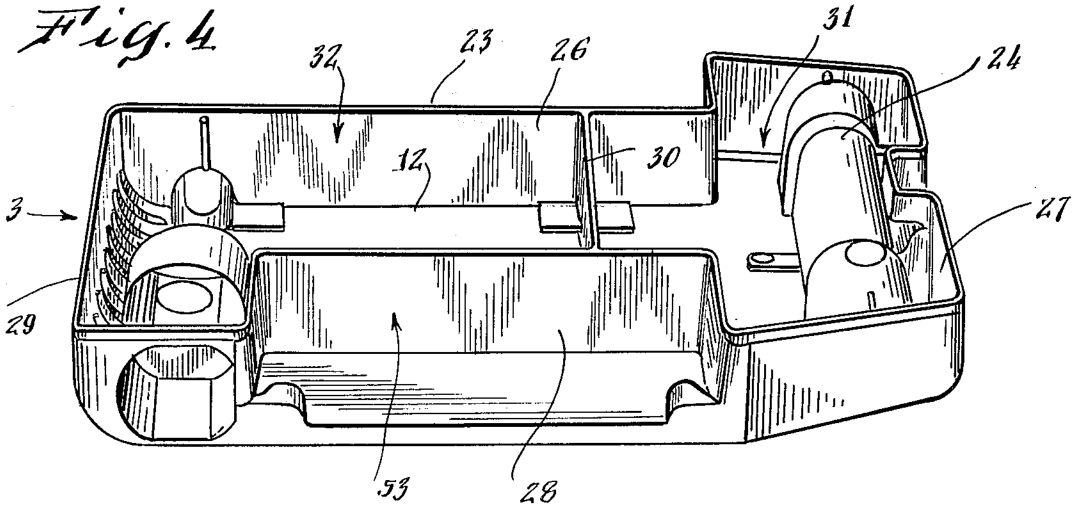
FIG. 4 is a perspective view of the lower engine housing.
Figure 6:
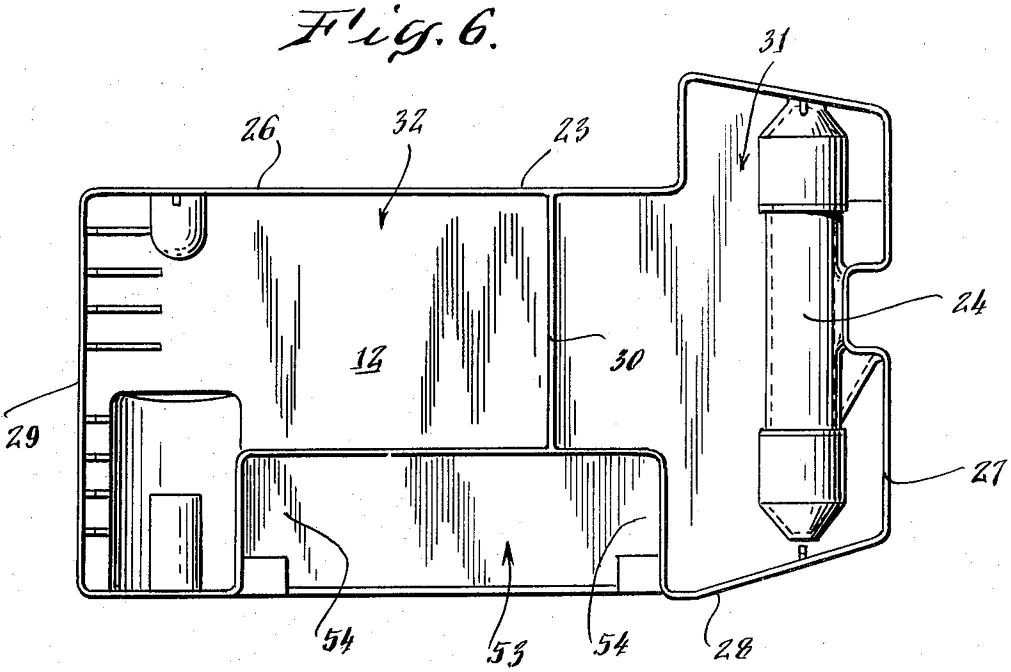
FIG. 6 is an upper plan view of the lower part of the engine housing.
Figure 5:
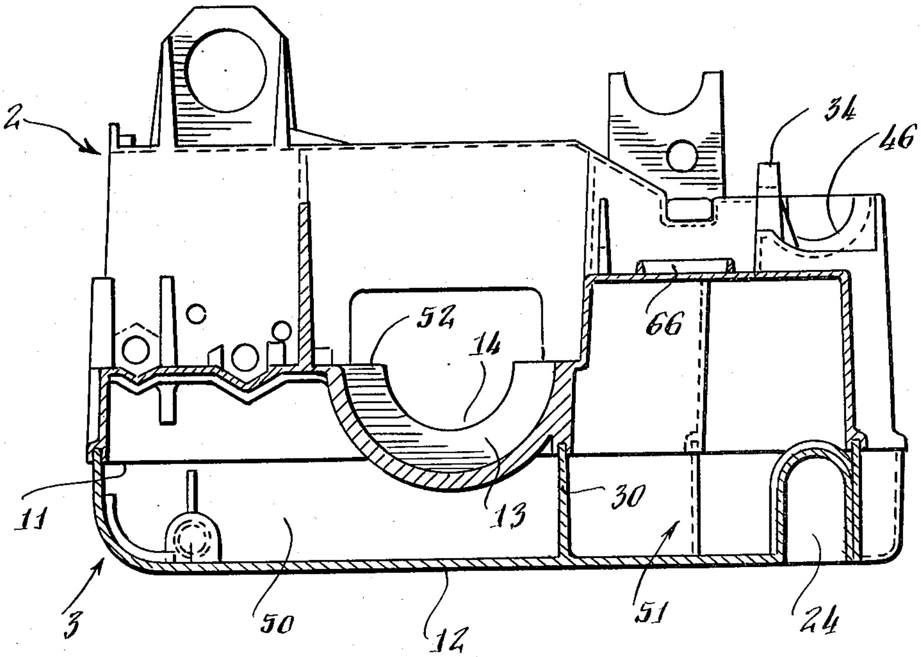
FIG. 5 is a vertical sectional view through the engine housing.
Figure 7:
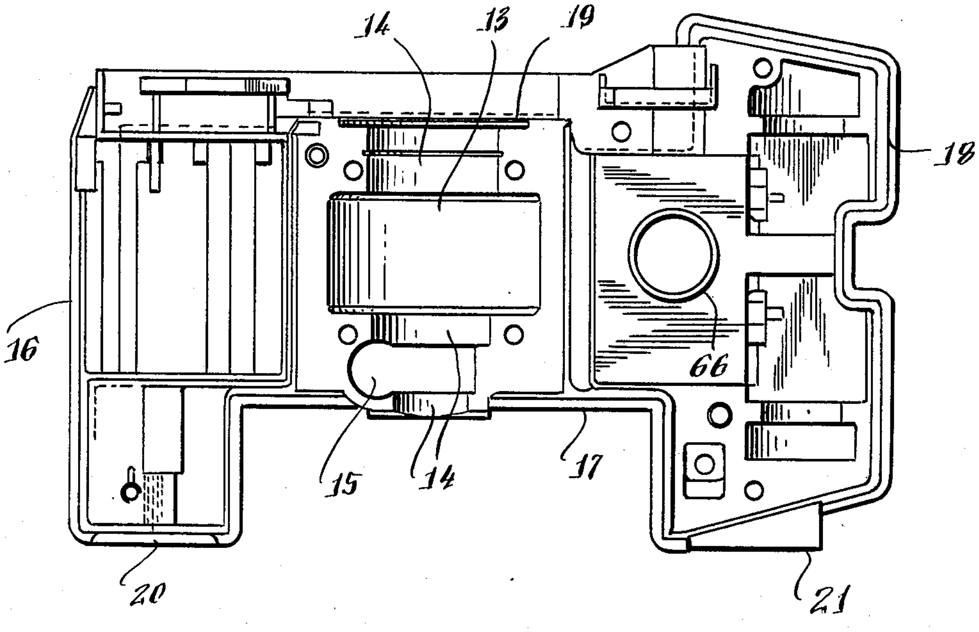
FIG. 7 is an upper plan view of the upper part of the engine.
Figure 8:
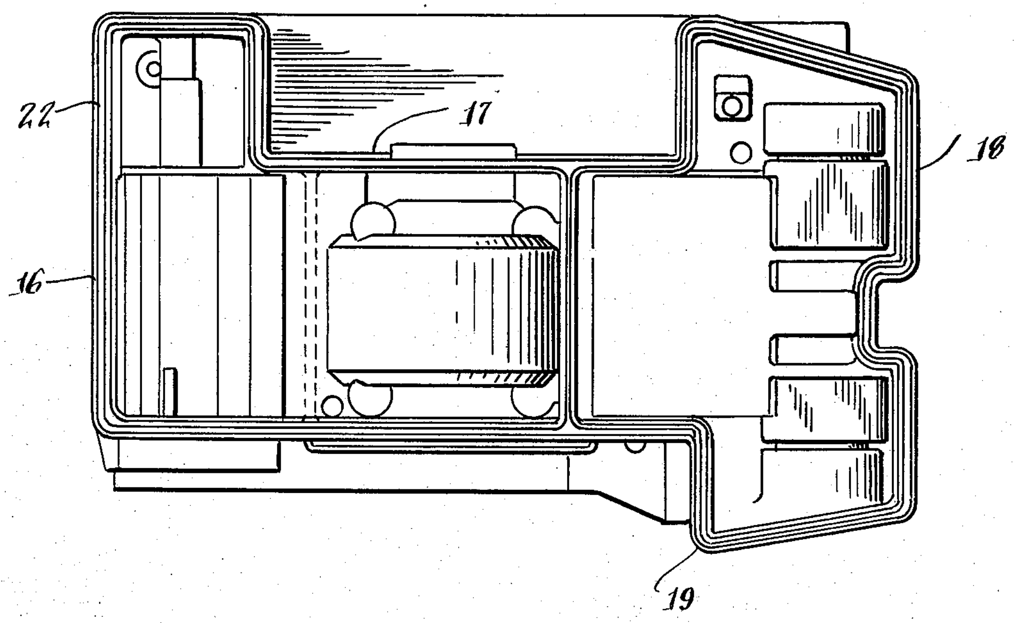
FIG. 8 is a bottom plan view of the upper part of the engine.
Figure 9:
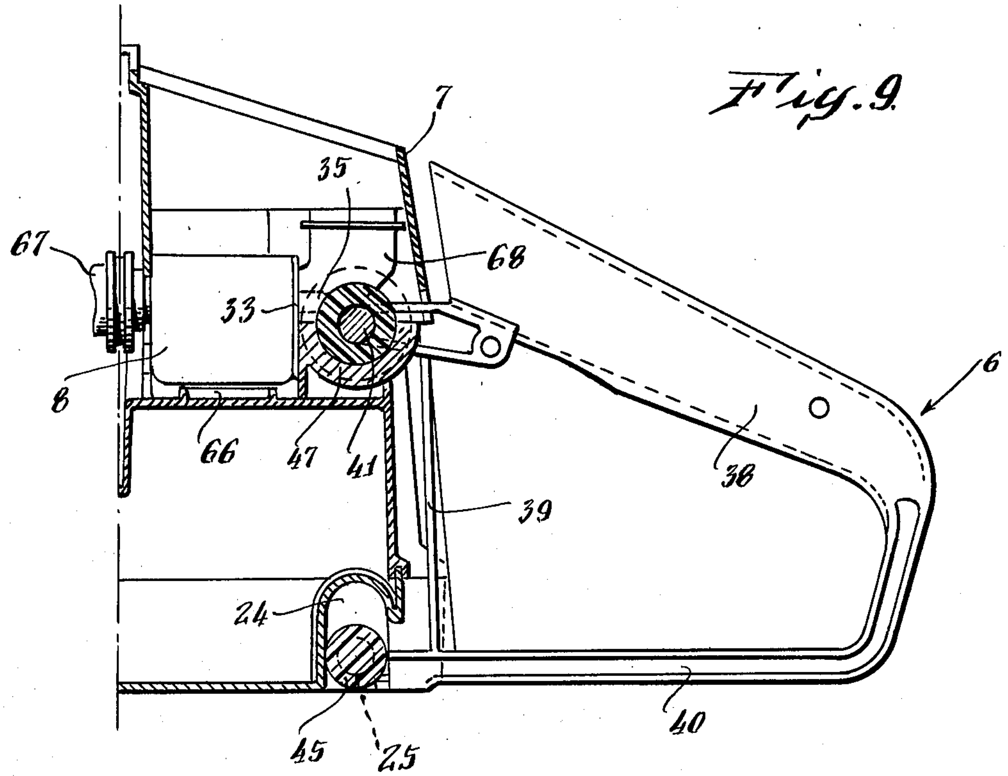
FIG. 9 is a side elevational view, partly in section, of the position of the handle in the assembly.
Figure 12:
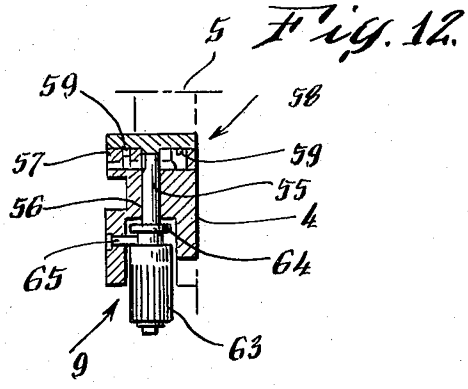
FIG. 12 is a sectional view of a portion of the crankcase part.
Figure 10:
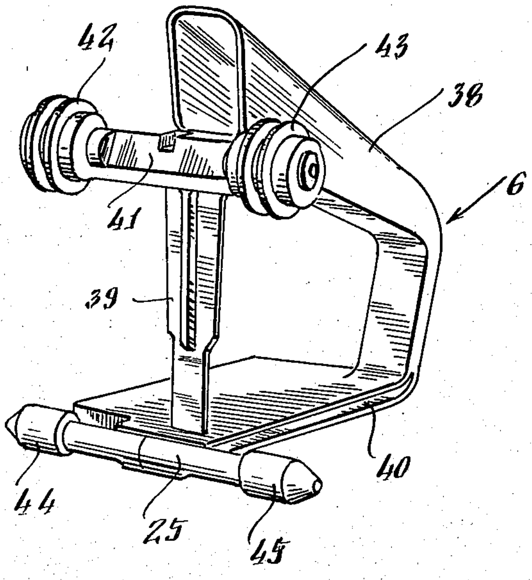
FIG. 10 is a perspective view of the handle.
Figure 11:
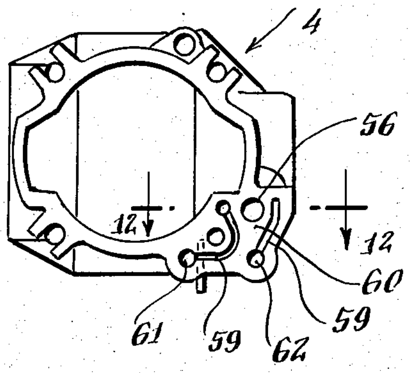
FIG. 11 is an upper plan view of a crankcase part.

The engine crankcase 13 is also provided with a flat surface referred to generally by the numeral 15 on the upper engine housing, and seen in FIGS. 3 and 5. In addition, reference numerals 51 and 52 refer to tanks seated in box-shaped cavities 31 and 32, respectively, for fuel and lubricating oil.

An advantage of the present oil pump design is a requirement of less machine finishing, i.e., due to the fact that the inlet and outlet channels to the oil pump are molded, and that the high tolerance demands of the cylindrical chamber of the pump are automatically satisfied at the same finishing time as when the milling of the surface 58 of the upper crankcase part 4 is carried out.

Moreover, the gasket between the crankcase part 4 and the cylinder can simultaneously be used as a packing for the oil pump 9.

The invention is not limited to the embodiment described hereinbefore, but a plurality of variations are possible within the spirit and scope of the following claims.

What is claimed is:

1. An engine housing for an internal combustion engine of the type used in chain saws having separate chambers for fuel and lubricating oil comprising: upper and lower portions of said engine housing that are joined along a dividing plane that is substantially parallel to the bottom surface of said lower portion and intersecting the crankshaft of said engine whereby substantially closed cavities forming said chambers for said fuel and lubricating oil are created.

2. An engine housing as claimed in claim 1 wherein said crankshaft case is constituted of two parts that are joined along the dividing plane intersecting said crankshaft.

3. An engine housing as claimed in claim 2 wherein said lower portion of said engine housing is box-like and said two parts of said crankshaft are disposed therein.

4. An engine housing as claimed in claim 1 wherein said lower portion thereof is box-like and is provided with an elongated recess therein opening through said bottom plate, and a handle for said engine housing having a cylindrical-shaped lower element that is insertable in said recess for partial attachment of said handle to said engine housing.

5. An engine housing as claimed in claim 4 wherein said upper portion of said housing is box-like and is provided with a pair of recesses which open upwardly, said handle being provided with an upper additional cylindrical element adapted to be inserted in said recesses which together with said cylindrical-shaped lower element completely attaches said handle to said engine housing.

6. An engine housing as claimed in claim 5 further providing pads of resilient material on both said cylindrical-shaped lower element and said upper additional cylindrical element respectively.

7. An engine housing as claimed in claim 6 wherein said cylindrical-shaped lower element is shaped as a pivot of the handle functioning in said elongated recess in said lower housing portion.

8. An engine housing as claimed in claim 7 wherein said handle is substantially U-shaped, with one of said legs forming a grip portion, while the other of said legs forms a hand shield, and said cylindrical-shaped lower element and upper additional cylindrical element being arranged at the free ends of the legs of said handle.

9. An engine housing as claimed in claim 8 further comprising a grip shoulder connecting the free ends of said U-shaped handle.

10. An engine housing as claimed in claim 9 further comprising a substantially rectangular fan housing disposed in both the upper and lower housing portions of said engine housing, said fan housing having portions therein for collecting sawdust.

* * * * *